United States Patent
Qidwai et al.

(10) Patent No.: US 12,324,056 B2
(45) Date of Patent: Jun. 3, 2025

(54) METHODS TO VALIDATE MULTI-SIM DEVICES WITH 3GPP-5G AND SNPN SUPPORT

(71) Applicant: QUALCOMM Incorporated, San Diego, CA (US)

(72) Inventors: Tauseef Ahmad Qidwai, Hyderabad (IN); Rajendra Prasad Nelurouth, Hyderabad (IN); Rohit Prasad Sharma, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 744 days.

(21) Appl. No.: 17/553,313

(22) Filed: Dec. 16, 2021

(65) Prior Publication Data

US 2023/0199474 A1 Jun. 22, 2023

(51) Int. Cl.
| | |
|---|---|
| H04W 8/18 | (2009.01) |
| H04L 9/06 | (2006.01) |
| H04L 9/08 | (2006.01) |
| H04W 12/06 | (2021.01) |
| H04W 12/45 | (2021.01) |

(Continued)

(52) U.S. Cl.
CPC ......... H04W 8/183 (2013.01); H04W 60/005 (2013.01); H04W 84/045 (2013.01); H04W 88/06 (2013.01)

(58) Field of Classification Search
None
See application file for complete search history.

(56) References Cited

U.S. PATENT DOCUMENTS

| | | | |
|---|---|---|---|
| 2016/0029204 A1* | 1/2016 | Lalwaney | H04W 8/205 455/418 |
| 2017/0201850 A1* | 7/2017 | Raleigh | H04W 4/50 |

(Continued)

FOREIGN PATENT DOCUMENTS

| | | | | |
|---|---|---|---|---|
| CN | 110557745 A | * | 12/2019 | |
| CN | 107889105 B | * | 2/2021 | H04W 12/06 |
| WO | 2021123892 A1 | | 6/2021 | |

OTHER PUBLICATIONS

GSM Association: "TS.37—Requirements for Multi SIM Devices", Security Classification: Non-Confidential 35—Procedures for Industry Specifications, Jul. 2, 2021 (Jul. 2, 2021), pp. 1-26, XP055865804, 2.5.1 SIM Selection, 2.5.6 Network & Service Provider locks.

(Continued)

*Primary Examiner* — Pablo N Tran
(74) *Attorney, Agent, or Firm* — Haynes and Boone, LLP

(57) ABSTRACT

Various aspects of the present disclosure generally relate to wireless communication. In some aspects, a user equipment (UE) is configured such that a SIM card inserted in the UE, which is invalid to camp on a network, may be allowed by the UE to camp on the network based on a preconfigured policy. The policy, for example, may require a valid SIM card to be inserted into a second SIM card slot on the UE. In some policies, the valid SIM card may also be required to camp on a network with full service in order to allow the invalid SIM card to camp on a network. In some policies, the valid SIM card may also be required to camp on a specific type of network, for example a standalone non-public network (SNPN) or a 3GPP network.

30 Claims, 6 Drawing Sheets

(51) Int. Cl.
*H04W 60/00* (2009.01)
*H04W 76/15* (2018.01)
*H04W 84/04* (2009.01)
*H04W 88/06* (2009.01)

(56) References Cited

U.S. PATENT DOCUMENTS

2019/0335325 A1* 10/2019 Vagelos ................ H04W 12/37
2020/0120483 A1* 4/2020 Chikkala ............... H04W 88/06
2020/0351652 A1 11/2020 Loreskär et al.

OTHER PUBLICATIONS

International Search Report and Written Opinion—PCT/US2022/050172—ISA/EPO—Apr. 13, 2023.
Qualcomm: "FS_ATSSS_Ph3: Dual 3GPP Access for PLMN + SNPN and PLMN + PLMN", S2-2108960, 3rd Generation Partnership Project (3GPP), Mobile Competence Centre, 650, Route Des Lucioles, F-06921 Sophia-Antipolis Cedex, France, Nov. 8, 2021, 7 Pages, XP052076803, The whole document.

* cited by examiner

METHODS TO VALIDATE MULTI-SIM DEVICES WITH 3GPP-5G AND SNPN SUPPORT

TECHNICAL FIELD

This application relates to wireless communication systems, and more particularly to validation of multi-subscriber identity module (Multi-SIM) devices.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

Some UE devices are sold at a subsidized price by operators, which is achieved by locking the UE to the operator's network. Locking, or "personalization" may be done either as a manufacturing step, or over the air by the operator. A subscriber identity module (SIM) inserted in a UE may be provided by the operator, such that the SIM is only able to be used with that provider's network. Some UE devices are equipped with the capability of using multiple subscriber identity modules (SIMs), leading to some challenges.

For example, devices which support both 3GPP (5G-NR) and standalone non-public networks (SNPN), a subsidized operator may need to personalize the UE for both kinds of networks rather than just one. Additionally, some current personalization solutions can only make sure that the user inserts the subsidized operator's card on one of the slots but does not ensure if the user is continuing to pay the operator's service bill. This allows the user to use a different operator's SIM card in another slot and use full 5G service. Therefore, there is a need for improved techniques for managing multi-SIM devices and validating them for use on a network.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method comprises determining, by a user equipment (UE), that a non-subsidy subscriber identity module (SIM) in a first slot of the UE is invalid to camp on a subsidy network. The method further comprises determining, by the UE, that a subsidy SIM in a second slot of the UE is valid to camp on the subsidy network. The method further comprises camping, by the UE based on a preconfigured policy that includes a condition that the subsidy SIM be valid for the subsidy network, the non-subsidy SIM on a second network.

In an additional aspect of the disclosure, a user equipment (UE) includes a memory and at least one processor coupled to the memory, the at least one processor being configured to, based in part on information stored in the memory, determine that a non-subsidy subscriber identity module (SIM) in a first slot of the UE is invalid to camp on a subsidy network. The processor is further configured to determine that a subsidy SIM in a second slot of the UE is valid to camp on the subsidy network. The processor is further configured to camp, based on a preconfigured policy that includes a condition that the subsidy SIM be valid for the subsidy network, the non-subsidy SIM on a second network.

In an additional aspect of the disclosure, a non-transitory computer-readable medium having program code recorded thereon, the program code comprises code for causing a user equipment (UE) to determine that a non-subsidy subscriber identity module (SIM) in a first slot of the UE is invalid to camp on a subsidy network. The program code further comprises code for causing the UE to determine that a subsidy SIM in a second slot of the UE is valid to camp on the subsidy network. The program code further comprises code for causing the UE to camp, based on a preconfigured policy that includes a condition that the subsidy SIM be valid for the subsidy network, the non-subsidy SIM on a second network.

In an additional aspect of the disclosure, a user equipment (UE) comprises means for determining that a non-subsidy subscriber identity module (SIM) in a first slot of the UE is invalid to camp on a subsidy network. The UE further comprises means for determining that a subsidy SIM in a second slot of the UE is valid to camp on the subsidy network. The UE further comprises means for camping, based on a preconfigured policy that includes a condition that the subsidy SIM be valid for the subsidy network, the non-subsidy SIM on a second network.

Other aspects, features, and embodiments will become apparent to those of ordinary skill in the art, upon reviewing the following description of specific, exemplary aspects in conjunction with the accompanying figures. While features may be discussed relative to certain aspects and figures below, all aspects can include one or more of the advantageous features discussed herein. In other words, while one or more aspects may be discussed as having certain advantageous features, one or more of such features may also be used in accordance with the various aspects discussed herein. In similar fashion, while exemplary aspects may be discussed below as device, system, or method aspects it should be understood that such exemplary aspects can be implemented in various devices, systems, and methods.

DETAILED DESCRIPTION

Figure 1:
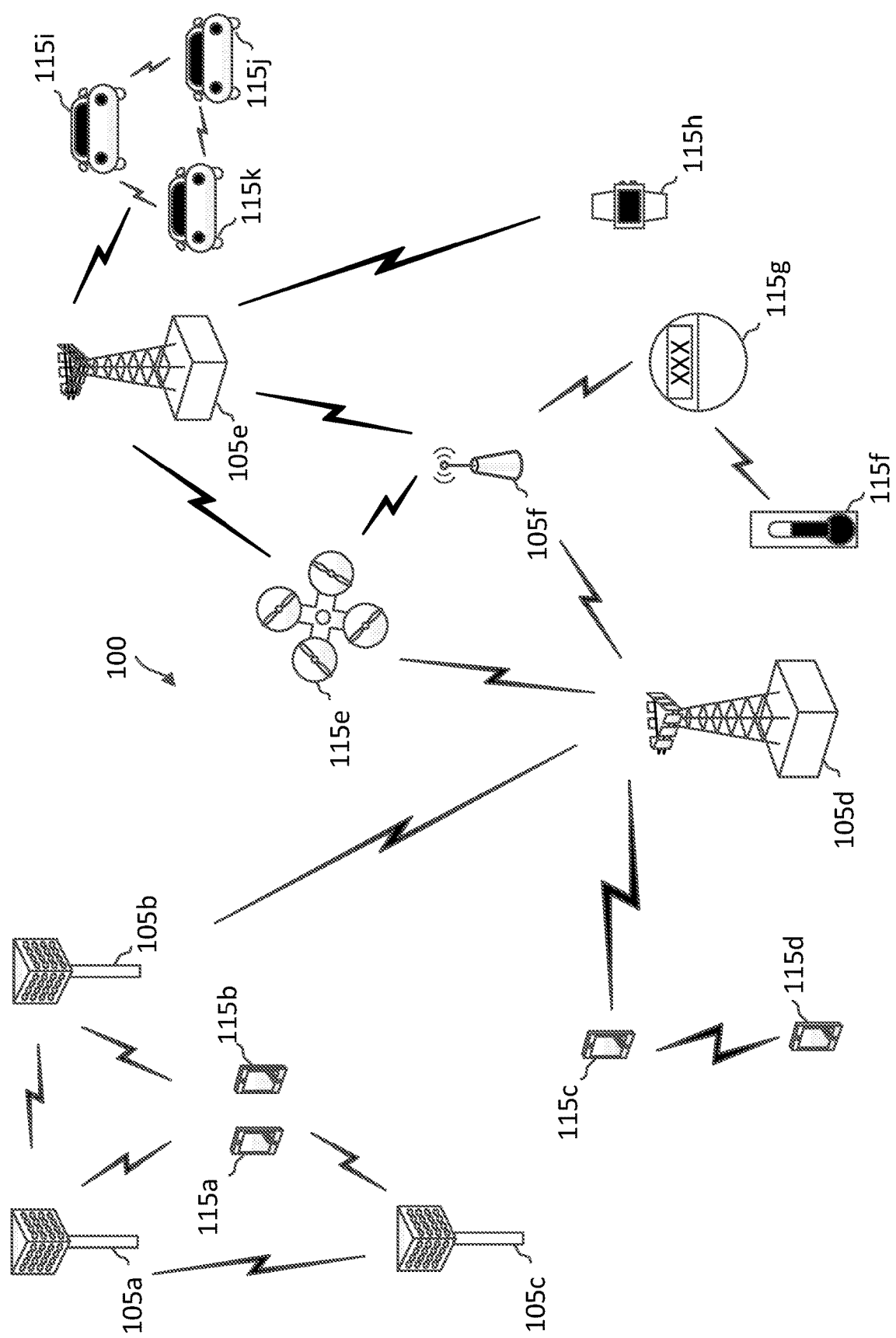
FIG. 1 illustrates a wireless communication network according to some aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some aspects, well-known structures and components are shown in block diagram form in order to avoid obscuring such concepts.

This disclosure relates generally to wireless communications systems, also referred to as wireless communications networks. In various aspects, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with a Ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including controls with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR system may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW. In certain aspects, frequency bands for 5G NR are separated into two different frequency ranges, a frequency range one (FR1) and a frequency range two (FR2). FR1 bands include frequency bands at 7 GHz or lower (e.g., between about 410 MHz to about 7125 MHz). FR2 bands include frequency bands in mmWave ranges between about 24.25 GHz and about 52.6 GHz. The mmWave bands may have a shorter range, but a higher bandwidth than the FR1 bands. Additionally, 5G NR may support different sets of subcarrier spacing for different frequency ranges.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

In certain aspects, a provider personalizes (i.e., specifies) a device such as a UE so that it may only be used on that provider's network. In this case, the provider is a "subsidized" provider, in that the purchase of the UE was subsidized in exchange for locking the UE to that provider's network. A subsidized provider's network in this context may be referred to as a subsidy network. A SIM may be considered valid if it has an identifier which links it to the operator which has personalized the UE in which it is inserted. In some aspects, such a SIM which is identified with the subsidy network is referred to as a subsidy SIM. Some UEs are multiple SIM (multi-SIM) devices capable of utilizing multiple subscriptions for communication with one or more networks. Multi-SIM UEs may be personalized for multiple networks/network types. The validity of a SIM, for example, may be determined by the UE by using values stored on the SIM card such as the international mobile subscriber identity (IMSI), integrated circuit card ID (ICCID), and/or a group identifier (GID).

In some aspects of the present disclosure, a UE may be configured such that there is a dependency between SIM cards allowing an otherwise invalid SIM card to be used with a network according to a preconfigured policy. Aspects are described herein with reference to two SIM cards. It should be understood, however, that the aspects of the present disclosure may be extended to include any number of SIM cards. A provider may configure a policy, for example, where a valid SIM card in slot 1 may validate an otherwise invalid SIM card on slots 2 and 3.

In one example, a UE may determine that a non-subsidy SIM in a first slot of the UE is invalid to camp on a subsidy network because the subsidy network is operated/controlled by a provider different from the provider of the non-subsidy SIM. In some aspects, the non-subsidy SIM is invalid to camp on the subsidy network because the non-subsidy SIM is provisioned for a different type of network, even though the SIM is identified as being linked to the provider of the first network. For example, the non-subsidy SIM may be for a standalone non-public network (SNPN), but the first network is a 3GPP network.

Continuing with the example, the UE determines that a subsidy SIM in a second slot of the UE is valid to camp on the subsidy network. This may be a SIM that is provided by the same provider as the network operator, and the UE is personalized (i.e., specified) to work with that network (i.e, the network operator is the subsidized operator). The UE may determine that the subsidy SIM is valid by comparing the IMSI on the second SIM with values stored on the UE.

The UE then determines that the non-subsidy SIM may camp on a second network based on a preconfigured policy. Effectively, the non-subsidy SIM card, which originally was considered invalid to camp on the subsidy network, is now allowed to camp on a second network based on the other SIM card according to the preconfigured policy. For example, based on the validity of the subsidy SIM and according to a preconfigured policy, the non-subsidy SIM may camp on a SNPN network, either operated by the first provider or by a second provider. In some aspects, the second network may be the same network as the first network. For example, if the subsidy SIM is valid to camp on a SNPN network operated by a first provider, the first SIM, which by itself is invalid to camp on the SNPN network, may be allowed to camp on the SNPN network according to the preconfigured policy. A UE may be preconfigured with a number of different policies, which may be determined by the subsidized operator. Such a policy may be applied to the UE, for example, at the time of manufacture or of provisioning to a network. Multiple policies are discussed with more detail herein, for example with reference to FIGS. 5 and 6.

The policies may be put into effect by a UE at different times. For example, every time that a SIM card is inserted into any slot, the UE may make a determination about the validity of the SIM cards (e.g., for just the SIM card inserted, or rechecking every SIM card when one is inserted). The UE may also determine validity of the SIM cards when attempting to camp on a network. After determining that the non-subsidy SIM is valid based on the policy, the UE may camp the non-subsidy SIM on the second network.

In aspects which require a SIM to camp on a network as part of the preconfigured policy, the policy may allow the other SIM to camp based on the subsidy SIM having camped previously, even if it is not currently camped on the network. For example, when the subsidy SIM camps on the network, the SIM IMSI value may be stored locally on the UE, indicating that the SIM has camped on the network. Using this information, if that SIM later is not camping on the network, the stored IMSI may still be used to indicate that the non-subsidy SIM may validly be used according to the preconfigured policy. By storing the IMSI, the UE may also determine whether the subsidy SIM card has been changed. Further details on such a policy is discussed herein with respect to FIG. 6.

There are a variety of benefits realized by utilizing aspects of the present disclosure. For example, an operator may not have to personalize a device for two kinds of networks. By using methods described herein, an operator my be able to personalize a device for one kind of deployed network and create dependency for other networks without really personalizing the device for other networks. It may be advantageous for an operator to allow an invalid SIM card (i.e., a device which is not allowed as per the operator) as long as the user has a valid SIM card inserted in their device in one of the slots to encourage buying their subsidized devices.

Some aspects of the present disclosure may prevent a problem with some personalization solutions where a user inserts subsidy giving operator's card on one of the slots, and a different operator's SIM card in another slot, allowing them to enjoy full 5G capabilities without paying the bill for the subsidized operator. The flexibility of allowing an operator to determine the policy with which a UE is configured allows an operator to configure a device in a way that is most advantageous to their model of providing and personalizing devices.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 (individually labeled as 115a, 115b, 115c, 115d, 115e, 115f, 115g, 115h, and 115k) and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support communications with ultra-reliable and redundant links for devices, such as the UE 115e, which may be airborne. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-action-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some aspects, the subcarrier spacing between adjacent subcarriers may be fixed, and the total number of subcarriers (K) may be dependent on the system BW. The system BW may also be partitioned into subbands. In other aspects, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information-reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for UL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some aspects, the BSs 105 may broadcast the PSS, the SSS, and/or the MIB in the form of synchronization signal block (SSBs) and may broadcast the RMSI and/or the OSI over a physical downlink shared channel (PDSCH). The MIB may be transmitted over a physical broadcast channel (PBCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant. The connection may be referred to as an RRC connection. When the UE 115 is actively exchanging data with the BS 105, the UE 115 is in an RRC connected state.

In an example, after establishing a connection with the BS 105, the UE 115 may initiate an initial network attachment procedure with the network 100. The BS 105 may coordinate with various network entities or fifth generation core (5GC) entities, such as an access and mobility function (AMF), a serving gateway (SGW), and/or a packet data network gateway (PGW), to complete the network attachment procedure. For example, the BS 105 may coordinate with the network entities in the 5GC to identify the UE, authenticate the UE, and/or authorize the UE for sending and/or receiving data in the network 100. In addition, the AMF may assign the UE with a group of tracking areas (TAs). Once the network attach procedure succeeds, a context is established for the UE 115 in the AMF. After a successful attach to the network, the UE 115 can move around the current TA. For tracking area update (TAU), the BS 105 may request the UE 115 to update the network 100 with the UE 115's location periodically. Alternatively, the UE 115 may only report the UE 115's location to the network 100 when entering a new TA. The TAU allows the network 100 to quickly locate the UE 115 and page the UE 115 upon receiving an incoming data packet or call for the UE 115.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, a provider personalizes (i.e., specifies) a device such as a UE 115 so that it may only be used on that provider's network (e.g., network 100). In this case, the provider is a "subsidized" provider, in that the purchase of the UE 115 was subsidized in exchange for locking the UE 115 to that provider's network. A SIM may be considered valid if it has an identifier which links it to the operator which has personalized the UE 115 in which it is inserted. Some UEs 115 are multiple SIM (multi-SIM) devices capable of utilizing multiple subscriptions for communication with one or more networks. Multi-SIM UEs 115 may be personalized for multiple networks/network types. The validity of a SIM, for example, may be determined by the UE 115 by using values stored on the SIM card such as the international mobile subscriber identity (IMSI), integrated circuit card ID (ICCID), and/or a group identifier (GID).

In some aspects of the present disclosure, a UE 115 may be configured such that there is a dependency between SIM cards allowing an otherwise invalid SIM card to be used with a network according to a preconfigured policy. Aspects are described herein with reference to two SIM cards.

In one example, a UE 115 may determine that a non-subsidy SIM in a first slot of the UE 115 is invalid to camp on a subsidy network because the subsidy network is operated/controlled by a provider different from the provider of the non-subsidy SIM. In some aspects, the non-subsidy SIM is invalid to camp on the subsidy network because the non-subsidy SIM is provisioned for a different type of network, even though the non-subsidy SIM is identified as being linked to the provider of the subsidy network. For example, the non-subsidy SIM may be for a standalone non-public network (SNPN), but the first network is a 3GPP network.

Continuing with the example, the UE 115 determines that a subsidy SIM in a second slot of the UE 115 is valid to camp on the subsidy network. This may be a SIM that is provided by the same provider as the network operator, and the UE 115 is personalized (i.e., specified) to work with that network (i.e, the network operator is the subsidized operator). The UE 115 may determine that the subsidy SIM is valid by comparing the IMSI on the second SIM with values stored on the UE 115.

The UE 115 then determines that the non-subsidy SIM may camp on a second network based on a preconfigured policy. Effectively, the non-subsidy SIM card, which originally was considered invalid to camp on the subsidy network, is now allowed to camp on a second network based on the subsidy SIM card according to the preconfigured policy. For example, based on the validity of the subsidy SIM and according to a preconfigured policy, the non-subsidy SIM may camp on a SNPN network, either operated by the first provider or by a second provider. In some aspects, the second network may be the same network as the first network. For example, if the subsidy SIM is valid to camp on a SNPN network operated by a first provider, the non-subsidy SIM, which by itself is invalid to camp on the SNPN network, may be allowed to camp on the SNPN network according to the preconfigured policy. A UE 115 may be preconfigured with a number of different policies, which may be determined by the subsidized operator. Such a policy may be applied to the UE 115, for example, at the time of manufacture or of provisioning to a network. Multiple policies are discussed with more detail herein, for example with reference to FIGS. 5 and 6.

Figure 2:
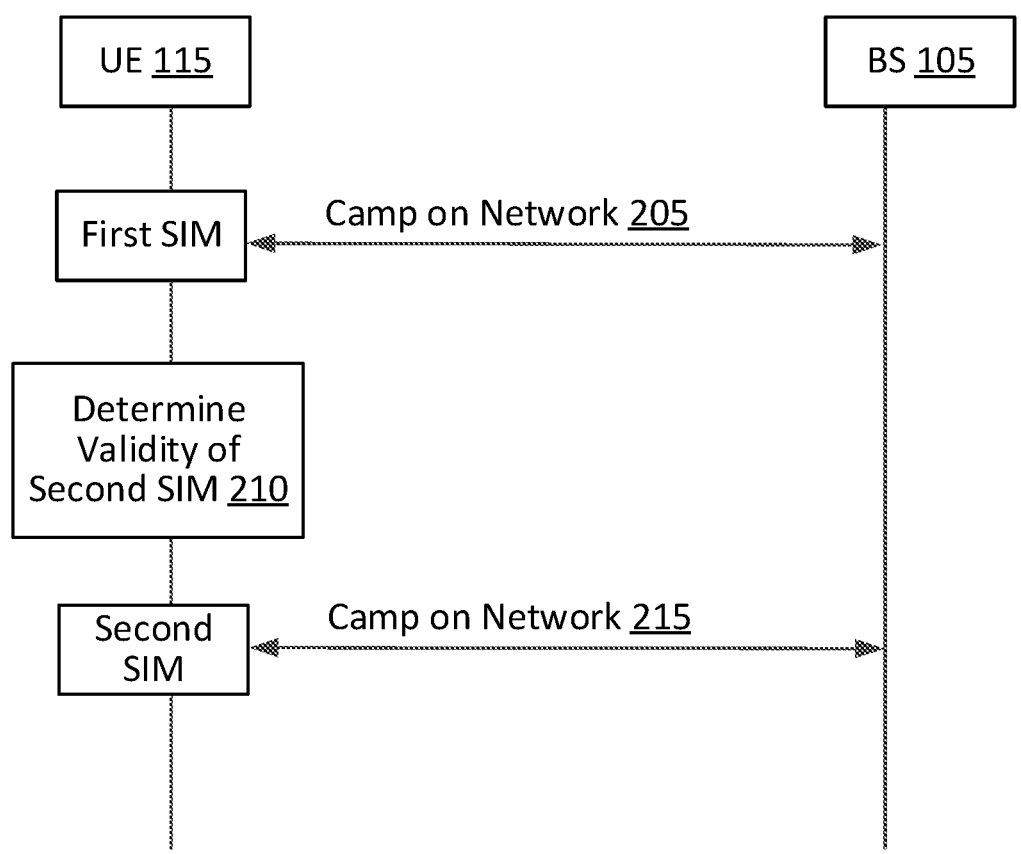
FIG. 2 illustrates an exemplary communication protocol diagram according to some aspects of the present disclosure.

FIG. 2 illustrates an exemplary communication protocol diagram 200 according to some aspects of the present disclosure. Aspects of the communication protocol diagram 200 may be performed by wireless networks, such as the network 100. In this regard, a BS 105 and UE 115 may perform functions of the communication protocol diagram 200. In some instances, the BS 105 may utilize TRPs to communicate with the UE 115. In some aspects, the BS 105 may utilize one or more components, such as the processor 302, the memory 304, the SIM validation module 308, the transceiver 310, the modem 312, and the one or more antennas 316 shown in FIG. 3, and the UE 115 may utilize one or more components, such as the processor 402, the memory 404, the SIM validation module 408, the transceiver 410, the modem 412, the one or more antennas 416, SIM Slot 1 418, and SIM Slot 2 420 shown in FIG. 4. As illustrated, the method 200 includes a number of enumerated actions, but aspects of the FIG. 2 may include additional actions before, after, and in between the enumerated actions. In some aspects, one or more of the enumerated actions may be omitted or performed in a different order.

At action 205, UE 115 camps on a network using a first SIM card. In this example, BS 105 belongs to the first network, and represents the first network. Camping may first require a UE to determine that the SIM is valid to camp on the network based on the personalization of UE 115. The validity of a SIM, for example, may be determined by UE 115 by reading the international mobile subscriber identity (IMSI) from the first SIM. The IMSI contains a mobile country code (MCC), mobile network code (MNC) and a mobile subscription identification number (MSIN). The MCC, MNC, and MSIN of the first SIM may be used to identify that the SIM was provisioned for the operator of the first network. For example, UE 115 may compare MCC and MNC values stored on UE 115 with the MCC and MNC stored on the first SIM. In the case of the first SIM being valid to camp on the first network, the MCC and/or MNC values would match. In some aspects, UE 115 may use other information for identifying the SIM such as the integrated circuit card ID (ICCID), or a group identifier (GID).

At action 210, UE 115 determines the validity of a second SIM card to camp on a network (e.g., the same network the first SIM is camped on). UE 115 may first determine whether the second SIM is valid to camp on the network in the same way as it determined the first SIM is valid. If it is valid based on its own configuration, then UE 115 may camp on the network using the second SIM without further evaluation. If the second SIM is invalid to camp on the network, then UE 115 may determine, based on a preconfigured policy, that the second SIM may still camp on the network based on the validity of the first SIM. Effectively, the second SIM card, which originally was considered invalid to camp on the network, is now allowed to camp on a second network based on the first SIM card according to the preconfigured policy. In some aspects, and as illustrated, the first network may be the same as the second network. For example, if the second SIM is valid to camp on a SNPN network operated by a first provider, the second SIM, which by itself is invalid to camp on the SNPN network, may be allowed to camp on the SNPN network according to the preconfigured policy. UE 115 may be preconfigured with a number of different policies, which may be determined by the subsidized operator. Such a policy may be applied to UE 115, for example, at the time of manufacture or of provisioning to a network. Multiple policies are discussed with more detail herein, for example with reference to FIGS. 5 and 6.

At action 215, UE 115 camps on the network using the second SIM. As illustrated, the second SIM is camped on the same network as the first SIM. In other aspects of the present disclosure, the policy may allow the second SIM to camp on a network other than the first network represented by BS 105.

Figure 3:
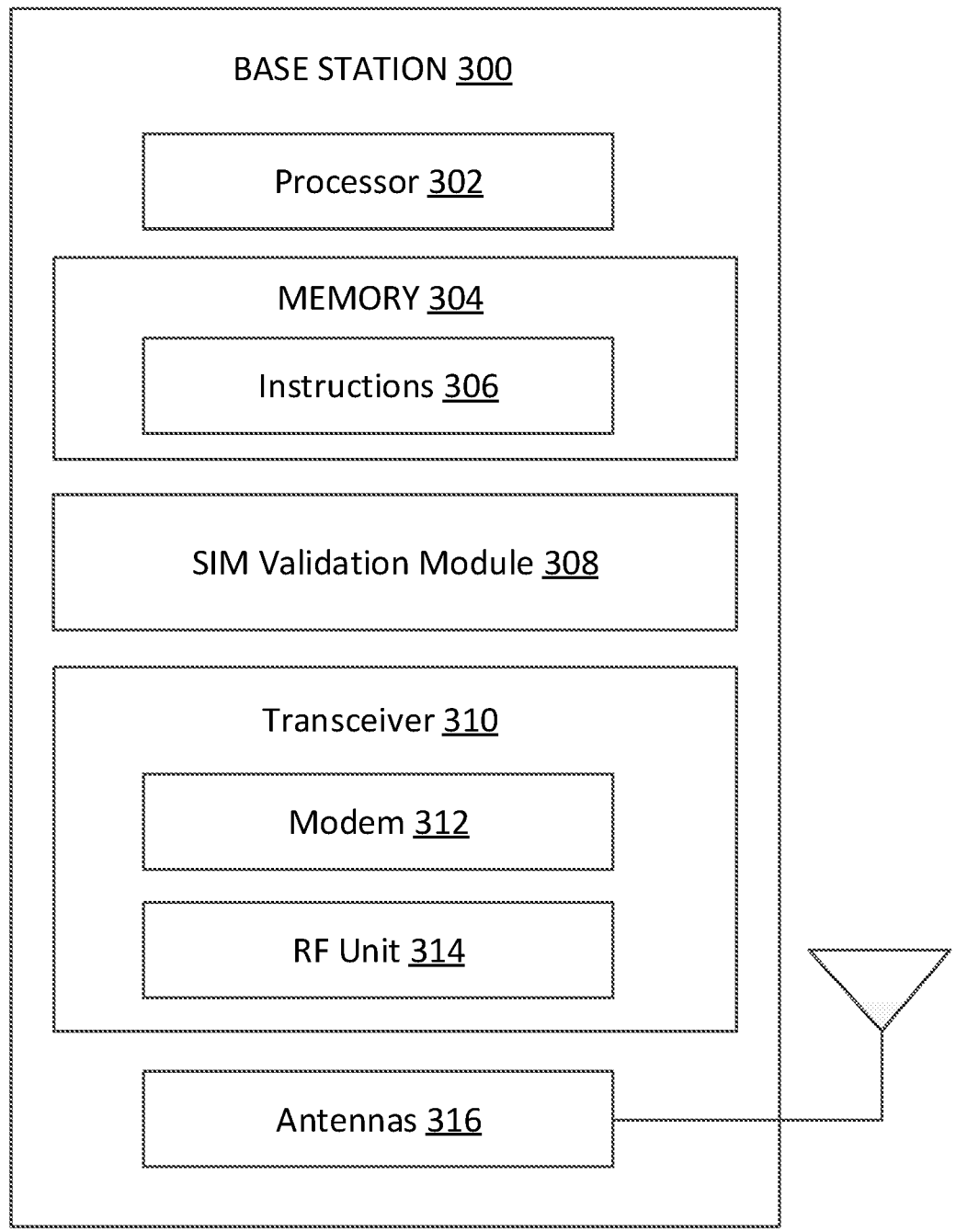
FIG. 3 illustrates a block diagram of an exemplary base station (BS) according to some aspects of the present disclosure.

FIG. 3 is a block diagram of an exemplary BS 300 according to some aspects of the present disclosure. The BS 300 may be a BS 105 as discussed in FIG. 1. As shown, the BS 300 may include a processor 302, a memory 304, a SIM validation module 308, a transceiver 310 including a modem subsystem 312 and a RF unit 314, and one or more antennas 316. These elements may be coupled with one another. The term "coupled" may refer to directly or indirectly coupled or connected to one or more intervening elements. For instance, these elements may be in direct or indirect communication with each other, for example via one or more buses.

The processor 302 may have various features as a specific-type processor. For example, these may include a CPU, a DSP, an ASIC, a controller, a FPGA device, another hardware device, a firmware device, or any combination thereof configured to perform the operations described herein. The processor 302 may also be implemented as a combination of computing devices, e.g., a combination of a DSP and a microprocessor, a plurality of microprocessors, one or more microprocessors in conjunction with a DSP core, or any other such configuration.

The memory 304 may include a cache memory (e.g., a cache memory of the processor 302), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 304 may include a non-transitory computer-readable medium. The memory 304 may store instructions 306. The instructions 306 may include instructions that, when executed by the processor 302, cause the processor 302 to perform operations described herein, for example, aspects of FIGS. 1-2 and 5-6. Instructions 306 may also be referred to as program code. The program code may be for causing a wireless communication device to perform these operations, for example by causing one or more processors (such as processor 302) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The SIM validation module 308 may be implemented via hardware, software, or combinations thereof. For example, the SIM validation module 308 may be implemented as a processor, circuit, and/or instructions 306 stored in the memory 304 and executed by the processor 302. In some examples, the SIM validation module 308 can be integrated within the modem subsystem 312. For example, the SIM validation module 308 can be implemented by a combination of software components (e.g., executed by a DSP or a general processor) and hardware components (e.g., logic gates and circuitry) within the modem subsystem 312. The SIM validation module 308 may communicate with one or more components of BS 300 to implement various aspects of the present disclosure, for example, aspects of FIGS. 1-2 and 5-6.

The SIM validation module 308 may perform a number of functions as described herein with reference to FIGS. 1-2 and 4-6. For example, the SIM validation module 308 may determine, when a SIM is attempting to camp on the network, whether that SIM is currently allowed to camp on the network. In some aspects, the SIM validation module 308 may determine that the user has not paid their phone bill, and may respond to a request from a UE 115 by indicating to the UE 115 that it is rejected from camping due to an operator determined barring. In some aspects, the SIM validation module 308 may allow a UE 115 to camp on the network.

As shown, the transceiver 310 may include the modem subsystem 312 and the RF unit 314. The transceiver 310 can be configured to communicate bi-directionally with other devices, such as the UEs 115, 215 and/or BS 300 and/or another core network element. The modem subsystem 312 may be configured to modulate and/or encode data according to a MCS, e.g., a LDPC coding scheme, a turbo coding scheme, a convolutional coding scheme, a digital beamforming scheme, etc. The RF unit 314 may be configured to process (e.g., perform analog to digital conversion or digital to analog conversion, etc.) modulated/encoded data (e.g., MIB, SIB signals, etc.) from the modem subsystem 312 (on outbound transmissions) or of transmissions originating from another source such as a UE 115 and/or UE 400. The RF unit 314 may be further configured to perform analog beamforming in conjunction with the digital beamforming.

Although shown as integrated together in transceiver 310, the modem subsystem 312 and/or the RF unit 314 may be separate devices that are coupled together at the BS 300 to enable the BS 300 to communicate with other devices.

The RF unit 314 may provide the modulated and/or processed data, e.g. data packets (or, more generally, data messages that may contain one or more data packets and other information), to the antennas 316 for transmission to one or more other devices. The antennas 316 may further receive data messages transmitted from other devices and provide the received data messages for processing and/or demodulation at the transceiver 310. The transceiver 310 may provide the demodulated and decoded data (e.g., PUSCH data, PUCCH UCI, etc.) to the SIM validation module 308 for processing. The antennas 316 may include multiple antennas of similar or different designs in order to sustain multiple transmission links.

In an aspect, the BS 300 can include multiple transceivers 310 implementing different RATs (e.g., NR and LTE). In an aspect, the BS 300 can include a single transceiver 310 implementing multiple RATs (e.g., NR and LTE). In an aspect, the transceiver 310 can include various components, where different combinations of components can implement different RATs.

Figure 4:
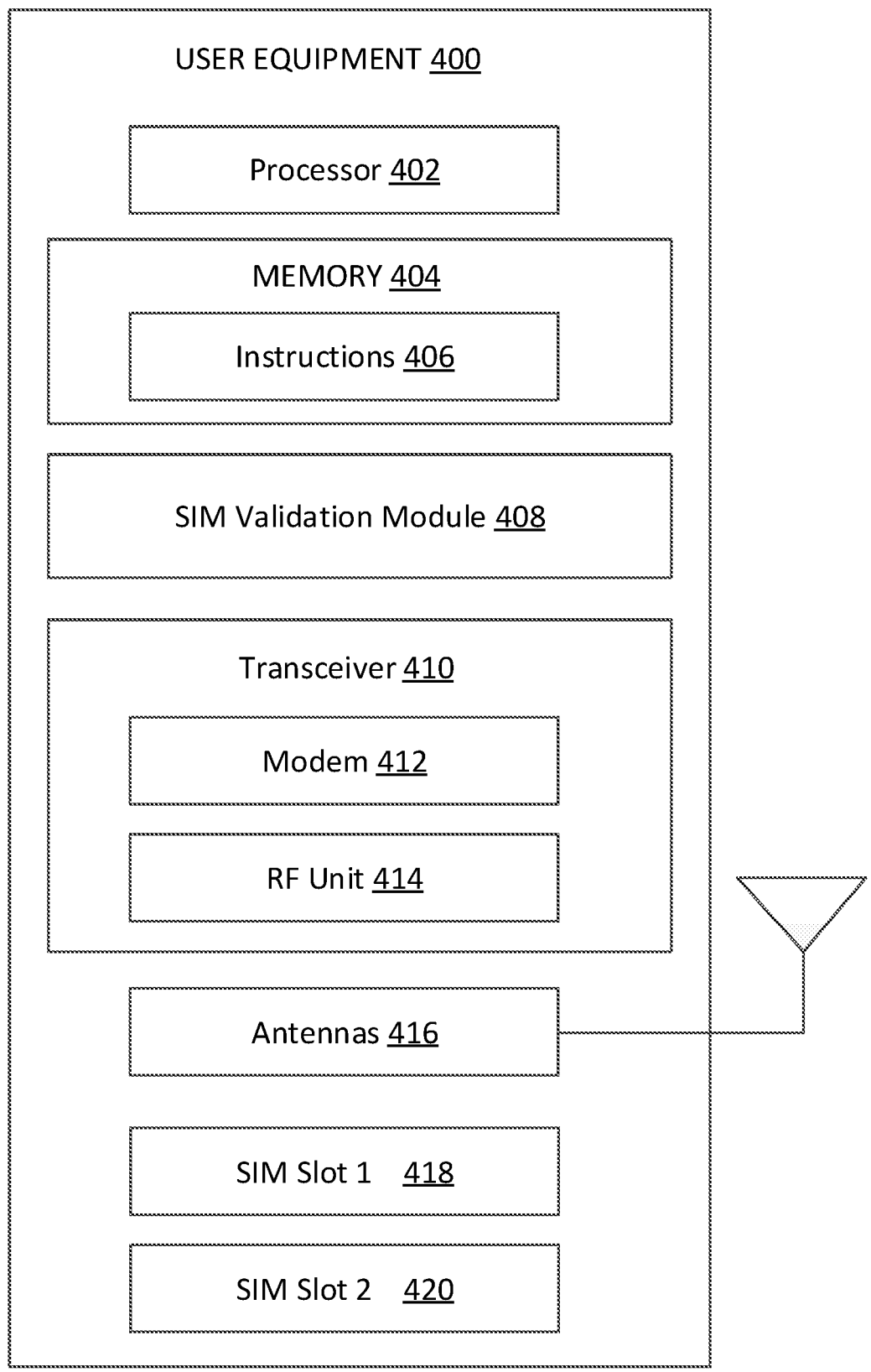
FIG. 4 illustrates a block diagram of an exemplary user equipment (UE) according to some aspects of the present disclosure.

FIG. 4 is a block diagram of an exemplary UE 400 according to some aspects of the present disclosure. The UE 400 may be a UE 115 as discussed above in FIG. 1. As shown, the UE 400 may include a processor 402, a memory 404, a SIM validation module 408, a transceiver 410 including a modem subsystem 412 and a radio frequency (RF) unit 414, one or more antennas 416, SIM Slot 1 418, and SIM Slot 2 420. These elements may be coupled with one another. The term "coupled" may refer to directly or indirectly coupled or connected to one or more intervening elements. For instance, these elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 404 includes a non-transitory computer-readable medium. In some aspects, the memory 404 may be a secure memory, or have a portion of its contents protected as a secure memory. For example, memory 404 may contain circuitry and/or software in order to protect all or certain portions of the contents of the memory. The memory 404 may store, or have recorded thereon, instructions 406. The instructions 406 may include instructions that, when executed by the processor 402, cause the processor 402 to perform the operations described herein with reference to a UE 115 in connection with aspects of the present disclosure, for example, aspects of FIGS. 1-2 and 5-6. Instructions 406 may also be referred to as code, which may include any type of computer-readable statements.

The SIM validation module 408 may be implemented via hardware, software, or combinations thereof. For example, the SIM validation module 408 may be implemented as a processor, circuit, and/or instructions 406 stored in the memory 404 and executed by the processor 402.

In some aspects, the SIM validation module 408 may perform functions with respect to SIM cards inserted into SIM Slot 1 416 and SIM Slot 2 420. In other aspects, a greater number of SIM card slots may be used for methods described herein. Each SIM may be configured to store information used for accessing a network, for example, to authenticate and identify the UE 400 as a subscriber of the network. Some examples of information stored on a SIM may include, but not limited to, a subscriber identity such as an international mobile subscriber identity (IMSI) and/or information and/or key used to identify and authenticate the UE 400 in a certain provider network. In some aspects, the UE 400 may have a first subscription on a first SIM in SIM Slot 1 418 and a second subscription on a second SIM in SIM Slot 2 420. The first subscription may identify the UE 400 by a first subscriber identity, and the second subscription may identify the UE 400 by a second subscriber identity. One of the SIMs may be a default data subscription (DDS) and the other the non-default data subscriptions (nDDS).

The SIM validation module 408 may be configured to determine that a first SIM in a first slot of the UE 400 is invalid to camp on a first network because the first network is operated/controlled by a provider different from the provider of the first SIM. In some aspects, the first SIM is invalid to camp on the first network because the SIM is provisioned for a different type of network, even though the SIM is identified as being linked to the provider of the first network. For example, the first SIM may be for a standalone non-public network (SNPN), but the first network is a 3GPP network.

Continuing with the example, the SIM validation module 408 determines that a second SIM in a second slot of the UE 400 is valid to camp on the first network. This may be a SIM that is provided by the same provider as the network operator, and the UE 400 is personalized (i.e., specified) to work with that network (i.e, the network operator is the subsidized operator). The SIM validation module 408 may determine that the second SIM is valid by comparing the IMSI on the second SIM with values stored in memory 404.

The SIM validation module 408 then determines that the first SIM may camp on a second network based on a preconfigured policy. Effectively, the first SIM card, which originally was considered invalid to camp on the first network, is now allowed to camp on a second network based on the other SIM card according to the preconfigured policy. For example, based on the validity of the second SIM and according to a preconfigured policy, the first SIM may camp on a SNPN network, either operated by the first provider or by a second provider. In some aspects, the second network may be the same network as the first network. For example, if the second SIM is valid to camp on a SNPN network operated by a first provider, the first SIM, which by itself is invalid to camp on the SNPN network, may be allowed to camp on the SNPN network according to the preconfigured policy. A SIM validation module 408 may be preconfigured with a number of different policies, which may be determined by the subsidized operator. Such a policy may be applied to the SIM validation module 408, for example, at the time of manufacture or of provisioning to a network. Multiple policies are discussed with more detail herein, for example with reference to FIGS. 5 and 6.

The policies may be put into effect by the SIM validation module 408 at different times. For example, every time that a SIM card is inserted into any slot, the SIM validation module 408 may make a determination about the validity of the SIM cards (e.g., for just the SIM card inserted, or rechecking every SIM card when one is inserted). The SIM validation module 408 may also determine validity of the SIM cards when attempting to camp on a network. After determining that the first SIM is valid based on the policy, the UE 400 may camp the first SIM on the second network.

In aspects which require a SIM to camp on a network as part of the preconfigured policy, the policy may allow the other SIM to camp based on the first SIM having camped previously, even if it is not currently camped on the network. For example, when the first SIM camps on the network, the SIM IMSI value may be stored locally on the UE 400 in memory 404, indicating that the SIM has camped on the network. Using this information, if that SIM later is not camping on the network, the stored IMSI may still be used to indicate that the other SIM may validly be used according to the preconfigured policy. By storing the IMSI, the SIM validation module 408 may also determine whether the SIM card has been changed. Further details on such a policy is discussed herein with respect to FIG. 6.

As shown, the transceiver 410 may include the modem subsystem 412 and the RF unit 414. The transceiver 410 can be configured to communicate bi-directionally with other devices, such as the BSs 105 and 500. The modem 412 may be configured to perform the actions with respect to FIGS. 1-2 and 5-6.

The modem subsystem 412 may be configured to modulate and/or encode the data from the memory 404, the SIM validation module 408 according to a modulation and coding scheme (MCS), e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., PUSCH data, etc.) or of transmissions originating from another source such as a UE 115, a BS 105, or an anchor. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 400 to enable the UE 400 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The transceiver 410 may provide the demodulated and decoded data (e.g., MIB, SSB signals, etc.) to the SIM validation module 408 for processing. The antennas 416 may include multiple antennas of similar or different designs in order to sustain multiple transmission links.

In an aspect, the UE 400 can include multiple transceivers 410 implementing different RATs (e.g., NR and LTE). In an aspect, the UE 400 can include a single transceiver 410 implementing multiple RATs (e.g., NR and LTE). In an aspect, the transceiver 410 can include various components, where different combinations of components can implement different RATs.

Figure 5:
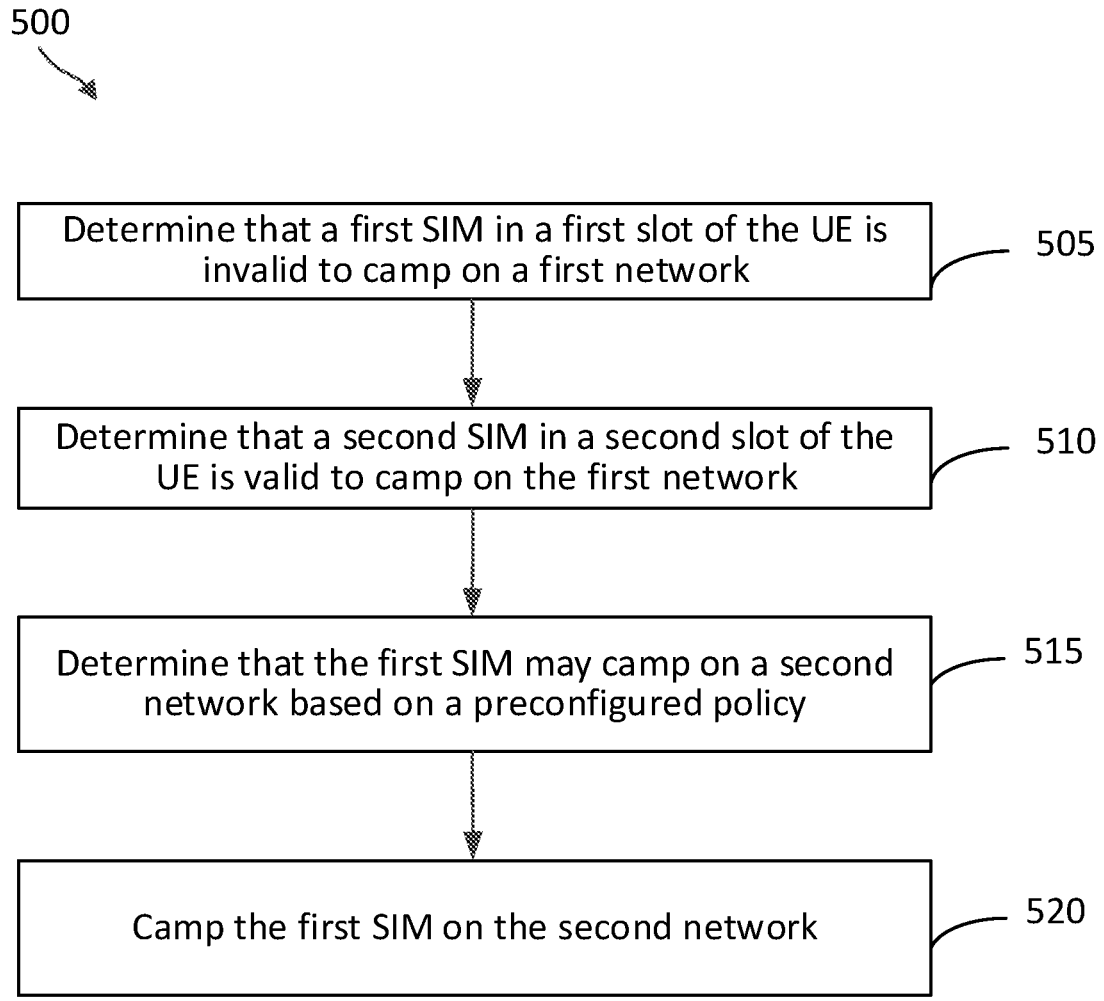
FIG. 5 illustrates a diagram of an exemplary method performed by a UE according to some aspects of the present disclosure.

FIG. 5 is a flowchart of a method 500 according to some aspects of the present disclosure. The method 500 may be performed by a UE, such as a UE 115 or 400. In some aspects, a UE 115 or 400 may perform the method 500 utilizing components such as the processor 402, the memory 404, the SIM validation module 408, the transceiver 410, the modem 412, the one or more antennas 416, SIM Slot 1 418, and SIM Slot 2 420 shown in FIG. 4. As illustrated, the method 500 includes a number of enumerated actions, but aspects of the method 500 may include additional actions before, after, and in between the enumerated actions. In some aspects, one or more of the enumerated actions may be omitted or performed in a different order.

At block 505, a user equipment (UE) determines that a first SIM in a first slot of the UE is invalid to camp on a first network. For example, a SIM may not be allowed to camp on the first network because the first network is operated/controlled by a provider different from the provider of the first SIM. A provider personalizes (i.e., specifies) a device such as a UE 115 so that it may only be used on that provider's network. In this case, the provider is a "subsidized" provider, in that the purchase of the UE was subsidized in exchange for locking the UE 115 to that provider's network. A SIM may be considered valid if it has an identifier which links it to the operator which has personalized the UE 115 in which it is inserted.

The validity of a SIM, for example, may be determined by the UE 115 by reading the international mobile subscriber identity (IMSI) from the first SIM. The IMSI contains a mobile country code (MCC), mobile network code (MNC) and a mobile subscription identification number (MSIN). The MCC, MNC, and MSIN of the first SIM may be used to identify that the SIM was provisioned for the operator of the first network. For example, the UE 115 may compare MCC and MNC values stored on the UE 115 with the MCC and MNC stored on the first SIM. In the case of the first SIM being invalid to camp on the first network, the MCC and/or MNC values would not match. In some aspects, the UE 115 may use other information for identifying the SIM such as the integrated circuit card ID (ICCID), or a group identifier (GID). In some aspects, the first SIM is invalid to camp on the first network because the SIM is provisioned for a different type of network, even though the SIM is identified as being linked to the provider of the first network. For example, the first SIM may be for a standalone non-public network (SNPN), but the first network is a 3GPP network. Because the first SIM card is invalid to camp on the first network belonging to the provider that preprovisioned the UE 115 with the preconfigured policy, aspects of the method 500 determine whether there is a valid SIM for the network belonging to the provider of the first network, which occurs according to block 510 below.

At block 510, the UE determines that a second SIM in a second slot of the UE 115 is valid to camp on the first network. This may be, for example, a SIM that is provided by the same provider as the network operator, and the UE is personalized (i.e., specified) to work with that network (i.e, the network operator is the subsidized operator). The UE 115 may determine that the second SIM is valid, for example, by comparing the MCC and MNC of the IMSI on the second SIM with the values stored on the UE 115 as described above with reference to the first SIM at block 505.

At block 515, the UE determines that the first SIM may camp on a second network based on a preconfigured policy.

Effectively, the first SIM card, which originally was considered invalid to camp on the first network, is now allowed to camp on a second network based on the other SIM card according to the preconfigured policy. For example, based on the validity of the second SIM and according to a preconfigured policy, the first SIM may camp on a SNPN network, either operated by the first provider or by a second provider. In some aspects, the second network may be the same network as the first network. For example, if the second SIM is valid to camp on a SNPN network operated by a first provider, the first SIM, which by itself is invalid to camp on the SNPN network, may be allowed to camp on the SNPN network according to the preconfigured policy. A UE may be preconfigured with a number of different policies, which may be determined by the subsidized operator when configuring the UE. Such a policy may be applied to the UE 115, for example, at the time of manufacture or of provisioning to a network.

In some aspects, the preconfigured policy requires a valid 3GPP card on any slot to make a 3GPP or SNPN card valid on the other slot. For example, having a SIM card in slot 1 which is determined to be valid on a 3GPP network, according to the policy, allows for a SIM card in slot 2 to be valid on an SNPN network. This policy could be used, for example, where a subsidized operator wants to personalize the UE 115 for one kind of deployed network (e.g., a 3GPP network) and create a dependency for another network (e.g., an SNPN network) without personalizing the UE 115 for that other network.

In some aspects, the preconfigured policy requires a valid SNPN card on any slot to make a 3GPP or SNPN card valid on the other slot. This policy is similar to the one described directly above, but the UE 115 is configured to require an SIM which is valid on a SNPN network rather than a 3GPP network. In both of these example policies, which slot each SIM is inserted into does not affect the outcome. In other aspects, the UE 115 may treat the SIM card slots differently by requiring that the valid SIM card be inserted in a specific slot (e.g., the first slot).

In some aspects, the preconfigured policy requires a valid 3GPP card with 3GPP NW full service on any slot to make a 3GPP or SNPN card valid on the other slot. The difference between this policy and those described directly above, is that a SIM being determined to be valid on a network is insufficient. The UE 115 under this policy requires additionally camping with full service on the required network. Camping with full service may mean, for example, the UE 115 is able to make regular calls from that SIM card using the network (here a 3GPP network), and not be limited, for example, to only emergency calls. While this policy does not differentiate between the SIM card slots, other policies with the same requirements may additionally require that the SIM card which is camped with full service be inserted into a specific slot (e.g., the first slot).

In some aspects, the preconfigured policy requires a valid SNPN card with SNPN NW full service on any slot to make a 3GPP or SNPN card valid on the other slot. Similar to the policy described directly above, this policy requires camping with full service, but rather than on a 3GPP network, it is configured to require camping on a SNPN network. While this policy does not differentiate between the SIM card slots, other policies with the same requirements may additionally require that the SIM card which is camped with full service be inserted into a specific slot (e.g., the first slot).

In some aspects, the preconfigured policy requires a valid SNPN card (or 3GPP card) to be present on both slots to treat both cards valid. In other words, a UE 115 with this configuration does not allow one valid SIM card to validate a second SIM card via dependency.

The above policies may be put into effect by a UE 115 at different times. For example, every time that a SIM card is inserted into any slot, the UE 115 may make a determination about the validity of the SIM cards (e.g., for just the SIM card inserted, or rechecking every SIM card when one is inserted). The UE 115 may also determine validity of the SIM cards when attempting to camp on a network.

In aspects which require a SIM to camp on a network as part of the preconfigured policy, the policy may allow the other SIM to camp based on the first SIM having camped previously. For example, when the first SIM camps on the network, the SIM IMSI value may be stored locally on the UE, indicating that the SIM has camped on the network. Using this information, if that SIM later is not camping on the network, the stored IMSI may still be used to indicate that the other SIM may validly be used according to the preconfigured policy. Further details on such a policy is discussed herein with respect to FIG. 6. Other aspects of method 600 may be also used together with aspects of method 500 depending on the configuration of the UE.

At block 520, the UE camps the second SIM on the second network. This is done in response to the determining that the second SIM is valid based on the preconfigured policy. The first network may be a different network than the second network, or the same.

Method 500 is described herein with reference to two SIM cards. It should be understood, however, that method 500 may be extended to include any number of SIM cards. A provider may configure a policy, for example, where a valid SIM card in slot 1 may validate an otherwise invalid SIM card on slots 2 and 3.

Figure 6:
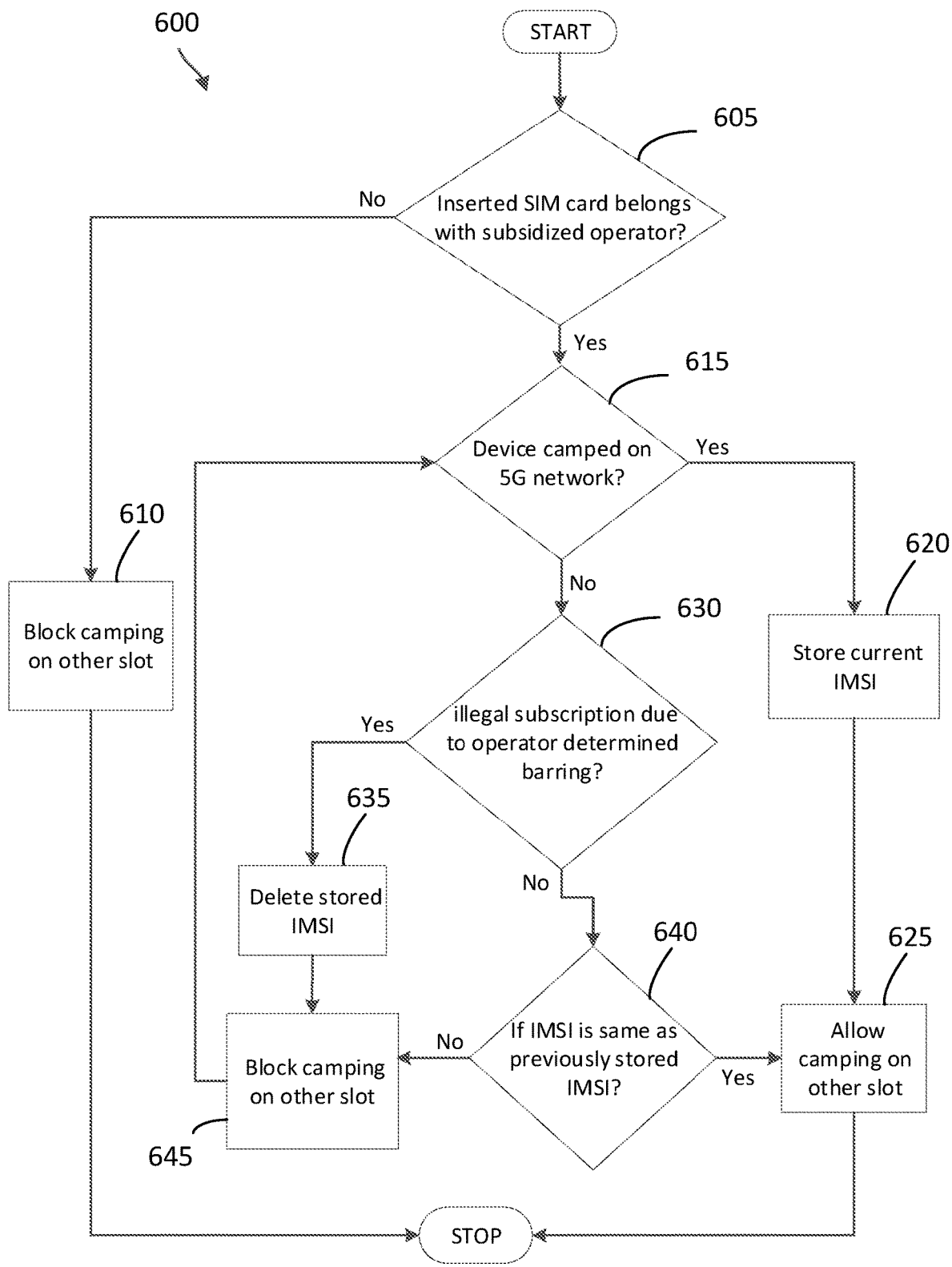
FIG. 6 illustrates a diagram of an exemplary method performed by a UE according to some aspects of the present disclosure.

FIG. 6 is a flowchart of a method 600 according to some aspects of the present disclosure. The method 600 may be performed by a UE, such as a UE 115 or 400. The method 600 may be considered to be an example of an implementation of a preconfigured policy such as those described with respect to FIG. 5. As illustrated, the method 600 includes a number of enumerated actions, but aspects of the method 600 may include additional actions before, after, and in between the enumerated actions. In some aspects, one or more of the enumerated actions may be omitted or performed in a different order.

At decision block 605, a user equipment (UE) 115 determines whether an inserted SIM card belongs with a subsidized operator. The subsidized operator being the operator which has personalized (i.e., specified) the UE 115 to it, for example in order to lock the UE 115 to only be used with that operator. If the inserted SIM does not belong to the subsidized operator, then the method 600 continues to block 610.

At block 610, the SIM inserted in the other slot is blocked from camping on the network operated by the subsidized operator. This is assuming that the SIM in the other slot is not, by itself, valid for camping on the subsidized operator's network. Returning to decision block 605, if the inserted SIM card does belong with the subsidized operator, then the method 600 instead continues to decision block 615.

At decision block 615, the UE 115 determines whether it is camped on the 5G network of the subsidized operator. In some aspects, the network may be a different type of network such as an SNPN network. If the UE 115 is currently camped on the network of the subsidized operator, then the method 600 continues to block 620.

At block 620, the UE 115 copies the IMSI from the SIM which is currently camped on the network and stores it in UE memory. By storing the IMSI in memory, this allows the UE to remember that the SIM card was at least previously camped on the network successfully.

At block 625, after storing the current IMSI, the UE 115 may allow camping using the SIM inserted into the other slot. This may be the case even when the SIM inserted into the other slot would not by itself be valid to camp on the network, but is allowed to based on the inserted SIM being validly camped on the network. This allows the subsidized operator to allow a UE 115 to permit an otherwise invalid SIM card to be used for camping on the network as long as the policy embodied by method 600 is complied with.

Returning to decision block 620, if instead the UE is not currently camped on the network of the subsidized operator, then the method 600 proceeds to decision block 630. At block 630, after determining that the inserted SIM card is not currently camped on the network, the UE 115 determines the reason the SIM card is no longer camped. When attempting to attach to a network, if a UE 115 is not allowed to attach, the network will return a code indicating the reason. In this case, if the SIM card is not allowed to camp because it is an illegal subscription due to an operator determined barring (which is one of the causes a network may indicate as the reason camping is not allowed), then the method 600 continues to block 640. If the SIM card is not allowed to camp for some other reason, the method 600 continues to decision block 635. An operator determined barring may, for example, be the case when the owner of the UE is not current with their phone bill, so the operator has barred the UE/SIM from using the network.

At block 635, after determining that the SIM is not camped on the network due to an operator determined barring at decision block 630, the UE deletes the stored IMSI. The IMSI was stored so that the UE could determine that the SIM was valid by virtue of it having been camped on the network either currently or previously. However, when the SIM was previously camped on the network validly, but is no longer due to an operator determined barring, then the UE deletes the IMSI, otherwise the UE would still be able to camp on the network using another invalid SIM when the operator is attempting to bar the UE. After deleting the stored IMSI, the method 600 continues from block 635 to block 645 in which the SIM inserted into the other slot is blocked from camping on the network.

Returning to decision block 630, if the UE determines that the subscription was not illegal due to operator determined barring, then the method 600 proceeds to decision block 640. At block 640, the UE determines if the IMSI of the inserted SIM card is the same as the IMSI which was stored previously. If the IMSI matches, this is an indication that the SIM card inserted into the slot has not changed. In this case, even though the SIM card is not currently camped on the network, the UE knows that it was previously camped on the network. The UE also knows that the SIM card was not barred due to an operator determined barring, as that was determined at block 630. Therefore, the inserted SIM card is determined to still be valid even though it is not currently camped on the network, and the method 600 may continue to block 625.

At block 625, the UE allows the SIM inserted into the other slot to camp on the network.

Returning to decision block 640, when the IMSI on the inserted SIM card does not match the stored IMSI, this may be an indication that SIM card has changed since it last camped on the network. Since the UE does not know if the inserted SIM card is valid, method 600 continues to block 645 at which it blocks the SIM card inserted into the other slot from camping on the network.

Further aspects of the present disclosure include the following clauses:

Aspect 1. A method of wireless communication, comprising:
  determining, by a user equipment (UE), that a non-subsidy subscriber identity module (SIM) in a first slot of the UE is invalid to camp on a subsidy network;
  determining, by the UE, that a subsidy SIM in a second slot of the UE is valid to camp on the subsidy network; and
  camping, by the UE based on a preconfigured policy that includes a condition that the subsidy SIM be valid for the subsidy network, the non-subsidy SIM on a second network.

Aspect 2. The method of aspect 1, wherein the preconfigured policy further includes a condition that the subsidy SIM is a 3GPP SIM or a Stand-alone Non-Public Network (SNPN) SIM, further comprising:
  determining that the second SIM is a 3rd Generation Partnership Project (3GPP) SIM or determining that the subsidy SIM is a stand-alone non-public network (SNPN) SIM.

Aspect 3. The method of aspect 2, wherein the preconfigured policy further includes a condition that the subsidy SIM be camped on the subsidy network with full service, further comprising:
  determining that the subsidy SIM is camped on the subsidy network with full service.

Aspect 4. The method of aspect 3, wherein the preconfigured policy further includes a condition that the subsidy SIM be inserted into slot 1, further comprising:
  determining that the subsidy SIM is inserted into slot 1.

Aspect 5. The method of aspect 3, wherein the preconfigured policy further includes a condition that the subsidy SIM be inserted into slot 2, further comprising:
  determining that the subsidy SIM is inserted into slot 2.

Aspect 6. The method of aspect 2, wherein the preconfigured policy further includes a condition that the subsidy SIM be inserted into slot 1, further comprising:
  determining that the subsidy SIM is inserted into slot 1.

Aspect 7. The method of aspect 2, wherein the preconfigured policy further includes a condition that the subsidy SIM be inserted into slot 2, further comprising:
  determining that the subsidy SIM is inserted into slot 2.

Aspect 8. The method of any of aspects 1-7, wherein an operator of the second network is the operator of the first network.

Aspect 9. The method of any of aspects 1 and 8, wherein the preconfigured policy further includes a condition that the subsidy SIM be camped on the subsidy network, further comprising:
  determining that the subsidy SIM is camped or was previously camped on the subsidy network.

Aspect 10. The method of aspect 9, further comprising:
  storing on the UE an International mobile subscriber identity (IMSI) of the subsidy SIM in response to the subsidy SIM camping on the subsidy network; and
  determining that the subsidy SIM was previously camped on the subsidy network based on the IMSI.

Aspect 11. The method of aspect 10, further comprising:
  deleting the IMSI off the UE in response to determining that the subsidy SIM is no longer camped on the subsidy network due to an operator determined barring.

Aspect 12. The method of aspect 10, further comprising:
retaining the IMSI on the UE after determining that the subsidy SIM is no longer camped on the subsidy network due to a reason other than an operator determined barring.

Aspect 13. A user equipment (UE), comprising:
a memory; and
at least one processor coupled to the memory, the at least one processor being configured to, based in part on information stored in the memory:
determine, that a non-subsidy subscriber identity module (SIM) in a first slot of the UE is invalid to camp on a subsidy network;
determine that a subsidy SIM in a second slot of the UE is valid to camp on the subsidy network; and
camp, based on a preconfigured policy that includes a condition that the subsidy SIM be valid for the subsidy network, the non-subsidy SIM on a second network.

Aspect 14. The UE of aspect 13, wherein the preconfigured policy further includes a condition that the subsidy SIM is a 3GPP SIM or a Stand-alone Non-Public Network (SNPN) SIM, further comprising:
determining that the subsidy SIM is a 3rd Generation Partnership Project (3GPP) SIM or determining that the subsidy SIM is a stand-alone non-public network (SNPN) SIM.

Aspect 15. The UE of aspect 14, wherein the preconfigured policy further includes a condition that the subsidy SIM be camped on the subsidy network with full service, further comprising:
determining that the subsidy SIM is camped on the subsidy network with full service.

Aspect 16. The UE of aspect 15, wherein the preconfigured policy further includes a condition that the subsidy SIM be inserted into slot 1, further comprising:
determining that the subsidy SIM is inserted into slot 1.

Aspect 17. The UE of aspect 15, wherein the preconfigured policy further includes a condition that the subsidy SIM be inserted into slot 2, further comprising:
determining that the subsidy SIM is inserted into slot 2.

Aspect 18. The UE of aspect 14, wherein the preconfigured policy further includes a condition that the subsidy SIM be inserted into slot 1, further comprising:
determining that the subsidy SIM is inserted into slot 1.

Aspect 19. The UE of aspect 14, wherein the preconfigured policy further includes a condition that the subsidy SIM be inserted into slot 2, further comprising:
determining that the subsidy SIM is inserted into slot 2.

Aspect 20. The UE of any of aspects 13-19, wherein an operator of the second network is the operator of the first network.

Aspect 21. The UE of any of aspects 13 and 20, wherein the preconfigured policy further includes a condition that the subsidy SIM be camped on the subsidy network, further comprising:
determining that the subsidy SIM is camped or was previously camped on the subsidy network.

Aspect 22. The UE of aspect 21, further comprising:
storing on the UE an International mobile subscriber identity (IMSI) of the subsidy SIM in response to the subsidy SIM camping on the subsidy network; and
determining that the subsidy SIM was previously camped on the subsidy network based on the IMSI.

Aspect 23. The UE of aspect 22, further comprising:
deleting the IMSI off the UE in response to determining that the subsidy SIM is no longer camped on the subsidy network due to an operator determined barring.

Aspect 24. The UE of aspect 22, further comprising:
retaining the IMSI on the UE after determining that the subsidy SIM is no longer camped on the subsidy network due to a reason other than an operator determined barring.

Aspect 25. A non-transitory computer-readable medium having program code recorded thereon, the program code comprising:
code for causing a user equipment (UE) to determine that a non-subsidy subscriber identity module (SIM) in a first slot of the UE is invalid to camp on a subsidy network;
code for causing the UE to determine that a subsidy SIM in a second slot of the UE is valid to camp on the subsidy network; and
code for causing the UE to camp, based on a preconfigured policy that includes a condition that the subsidy SIM be valid for the subsidy network, the non-subsidy SIM on a second network.

Aspect 26. The non-transitory computer-readable medium of aspect 25, wherein the preconfigured policy further includes a condition that the subsidy SIM is a 3GPP SIM or a Stand-alone Non-Public Network (SNPN) SIM, further comprising:
code for causing the UE to determine that the subsidy SIM is a 3rd Generation Partnership Project (3GPP) SIM or determining that the subsidy SIM is a stand-alone non-public network (SNPN) SIM.

Aspect 27. The non-transitory computer-readable medium of aspect 26, wherein the preconfigured policy further includes a condition that the subsidy SIM be camped on the subsidy network with full service, further comprising:
code for causing the UE to determine that the subsidy SIM is camped on the subsidy network with full service.

Aspect 28. A user equipment (UE), comprising:
means for determining that a non-subsidy subscriber identity module (SIM) in a first slot of the UE is invalid to camp on a subsidy network;
means for determining that a subsidy SIM in a second slot of the UE is valid to camp on the subsidy network; and
means for camping, based on a preconfigured policy that includes a condition that the subsidy SIM be valid for the subsidy network, the non-subsidy SIM on a second network.

Aspect 29. The UE of aspect 28, wherein the preconfigured policy further includes a condition that the subsidy SIM is a 3GPP SIM or a Stand-alone Non-Public Network (SNPN) SIM, further comprising:
determining that the subsidy SIM is a 3rd Generation Partnership Project (3GPP) SIM or determining that the subsidy SIM is a stand-alone non-public network (SNPN) SIM.

Aspect 30. The UE of aspect 29, wherein the preconfigured policy further includes a condition that the subsidy SIM be camped on the subsidy network with full service, further comprising:
determining that the subsidy SIM is camped on the network with full service.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular aspects illustrated and described herein, as they are merely by way of some examples thereof, but rather, should be fully commensurate with that of the claims appended hereafter and their functional equivalents.

What is claimed is:

1. A method of wireless communication performed by a user equipment (UE), comprising:
   determining that a non-subsidy subscriber identity module (SIM) in a first slot of the UE is invalid to camp on a subsidy network;
   determining that a subsidy SIM in a second slot of the UE is valid to camp on the subsidy network; and
   camping the non-subsidy SIM on a second network different from the subsidy network in response to determining that the subsidy SIM in the second slot of the UE is valid to camp on the subsidy network.

2. The method of claim 1, wherein the preconfigured policy further includes a condition that the subsidy SIM is a 3GPP SIM or a Stand-alone Non-Public Network (SNPN) SIM, further comprising:
   determining that the subsidy SIM is a 3rd Generation Partnership Project (3GPP) SIM or determining that the subsidy SIM is a stand-alone non-public network (SNPN) SIM.

3. The method of claim 2, wherein the preconfigured policy further includes a condition that the subsidy SIM be camped on the subsidy network with full service, further comprising:
   determining that the subsidy SIM is camped on the subsidy network with full service.

4. The method of claim 3, wherein the preconfigured policy further includes a condition that the subsidy SIM be inserted into slot 1, further comprising:
   determining that the subsidy SIM is inserted into slot 1.

5. The method of claim 3, wherein the preconfigured policy further includes a condition that the subsidy SIM be inserted into slot 2, further comprising:
   determining that the subsidy SIM is inserted into slot 2.

6. The method of claim 2, wherein the preconfigured policy further includes a condition that the subsidy SIM be inserted into slot 1, further comprising:
   determining that the subsidy SIM is inserted into slot 1.

7. The method of claim 2, wherein the preconfigured policy further includes a condition that the subsidy SIM be inserted into slot 2, further comprising:
   determining that the subsidy SIM is inserted into slot 2.

8. The method of claim 1, wherein an operator of the second network is the operator of the subsidy network.

9. The method of claim 1, wherein the preconfigured policy further includes a condition that the subsidy SIM be camped on the subsidy network, further comprising:
   determining that the subsidy SIM is camped or was previously camped on the subsidy network.

10. The method of claim 9, further comprising:
    storing on the UE an International mobile subscriber identity (IMSI) of the subsidy SIM in response to the subsidy SIM camping on the subsidy network; and
    determining that the subsidy SIM was previously camped on the subsidy network based on the IMSI.

11. The method of claim 10, further comprising:
    deleting the IMSI off the UE in response to determining that the subsidy SIM is no longer camped on the subsidy network due to an operator determined barring.

12. The method of claim 10, further comprising:
    retaining the IMSI on the UE after determining that the subsidy SIM is no longer camped on the subsidy network due to a reason other than an operator determined barring.

13. A user equipment (UE), comprising:
    a memory; and
    at least one processor coupled to the memory, the at least one processor being configured to, based in part on information stored in the memory:
       determine, that a non-subsidy subscriber identity module (SIM) in a first slot of the UE is invalid to camp on a subsidy network;
       determine that a subsidy SIM in a second slot of the UE is valid to camp on the subsidy network; and
       camp the non-subsidy SIM on a second network different from the subsidy network in response to determining that the subsidy SIM in the second slot of the UE is valid to camp on the subsidy network.

14. The UE of claim 13, wherein the preconfigured policy further includes a condition that the subsidy SIM is a 3GPP SIM or a Stand-alone Non-Public Network (SNPN) SIM, further comprising:
    determining that the subsidy SIM is a 3rd Generation Partnership Project (3GPP) SIM or determining that the subsidy SIM is a stand-alone non-public network (SNPN) SIM.

15. The UE of claim 14, wherein the preconfigured policy further includes a condition that the subsidy SIM be camped on the subsidy network with full service, further comprising:
    determining that the subsidy SIM is camped on the subsidy network with full service.

16. The UE of claim 15, wherein the preconfigured policy further includes a condition that the subsidy SIM be inserted into slot 1, further comprising:
   determining that the subsidy SIM is inserted into slot 1.

17. The UE of claim 15, wherein the preconfigured policy further includes a condition that the subsidy SIM be inserted into slot 2, further comprising:
   determining that the subsidy SIM is inserted into slot 2.

18. The UE of claim 14, wherein the preconfigured policy further includes a condition that the subsidy SIM be inserted into slot 1, further comprising:
   determining that the subsidy SIM is inserted into slot 1.

19. The UE of claim 14, wherein the preconfigured policy further includes a condition that the subsidy SIM be inserted into slot 2, further comprising:
   determining that the subsidy SIM is inserted into slot 2.

20. The UE of claim 13, wherein an operator of the second network is the operator of the subsidy network.

21. The UE of claim 13, wherein the preconfigured policy further includes a condition that the subsidy SIM be camped on the subsidy network, further comprising:
   determining that the subsidy SIM is camped or was previously camped on the subsidy network.

22. The UE of claim 21, further comprising:
   storing on the UE an International mobile subscriber identity (IMSI) of the second non-subsidy SIM in response to the subsidy SIM camping on the subsidy network; and
   determining that the subsidy SIM was previously camped on the subsidy network based on the IMSI.

23. The UE of claim 22, further comprising:
   deleting the IMSI off the UE in response to determining that the subsidy SIM is no longer camped on the subsidy network due to an operator determined barring.

24. The UE of claim 22, further comprising:
   retaining the IMSI on the UE after determining that the subsidy SIM is no longer camped on the subsidy network due to a reason other than an operator determined barring.

25. A non-transitory computer-readable medium having program code recorded thereon, the program code comprising:
   code for causing a user equipment (UE) to determine that a non-subsidy subscriber identity module (SIM) in a first slot of the UE is invalid to camp on a subsidy network;
   code for causing the UE to determine that a subsidy SIM in a second slot of the UE is valid to camp on the subsidy network; and
   code for causing the UE to camp the non-subsidy SIM on a second network different from the subsidy network in response to determining that the subsidy SIM in the second slot of the UE is valid to camp on the subsidy network.

26. The non-transitory computer-readable medium of claim 25, wherein the preconfigured policy further includes a condition that the subsidy SIM is a 3GPP SIM or a Stand-alone Non-Public Network (SNPN) SIM, further comprising:
   code for causing the UE to determine that the subsidy SIM is a 3rd Generation Partnership Project (3GPP) SIM or determining that the subsidy SIM is a stand-alone non-public network (SNPN) SIM.

27. The non-transitory computer-readable medium of claim 26, wherein the preconfigured policy further includes a condition that the subsidy SIM be camped on the subsidy network with full service, further comprising:
   code for causing the UE to determine that the subsidy SIM is camped on the subsidy network with full service.

28. A user equipment (UE), comprising:
   means for determining that a non-subsidy subscriber identity module (SIM) in a first slot of the UE is invalid to camp on a subsidy network;
   means for determining that a subsidy SIM in a second slot of the UE is valid to camp on the subsidy network; and
   means for camping the non-subsidy SIM on a second network different from the subsidy network in response to determining that the subsidy SIM in the second slot of the UE is valid to camp on the subsidy network.

29. The UE of claim 28, wherein the preconfigured policy further includes a condition that the subsidy SIM is a 3GPP SIM or a Stand-alone Non-Public Network (SNPN) SIM, further comprising:
   determining that the subsidy SIM is a 3rd Generation Partnership Project (3GPP) SIM or determining that the subsidy SIM is a stand-alone non-public network (SNPN) SIM.

30. The UE of claim 29, wherein the preconfigured policy further includes a condition that the subsidy SIM be camped on the subsidy network with full service, further comprising:
   determining that the subsidy SIM is camped on the subsidy network with full service.

\* \* \* \* \*